FIG. I

INVENTOR.
JACK SINGLETON

Sept. 10, 1968   J. SINGLETON   3,400,821
FILTER CHECK VALVE
Filed Feb. 17, 1967   2 Sheets-Sheet 2

INVENTOR.
JACK SINGLETON
BY Charles Marks
ATTORNEY

United States Patent Office 3,400,821
Patented Sept. 10, 1968

3,400,821
FILTER CHECK VALVE
Jack Singleton, Sparta, N.J., assignor to Fluid Dynamics Incorporated, a corporation of New York
Filed Feb. 17, 1967, Ser. No. 616,902
5 Claims. (Cl. 210—136)

ABSTRACT OF THE DISCLOSURE

A filter having a quick-opening and closing check valve positioned within the outlet channel. The check valve is self-positioning to permit maximum flow with minimum resistance and utilizes the excess energy arising from a quick opening of the valve discs to effect rapid positioning or closure thereof.

BACKGROUND OF THE INVENTION

1. *Field of the invention*

This invention relates generally to filters and is particularly concerned with an improved T-type filter wherein a check valve is employed in the outlet channel of the filter.

T-type filters, so-called because their inlet and outlet members are aligned and disposed perpendicularly to a chamber housing a filter element, thereby assuming the configuration of the letter T, are well known. Such filters are employed with liquids and gases under very high pressures wherein fluid flow is extremely rapid and it is desireable to introduce means for opposing reverse flow while at the same time minimizing any resistance to downstream flow.

2. *Description of the prior art*

In conventional filters, it frequently happens that non-return valves are utilized externally of the filter and not only require additional space but make little or no provision for minimizing their resistance to fluid flow, thereby permitting diminished fluid flow through the filter and a resulting decrease in filter efficiency. The present invention solves these problems.

SUMMARY OF THE INVENTION

In the present invention, an adjustable, spring-biased check valve is disposed within the outlet channel so as to permit the fluid flow therethrough to position the valve discs to their open position and permit rapid closure thereof when the fluid flow falls below a predetermined level. Moreover, when fluid flow exceeds a certain predetermined level, as in the case of sudden explosive flow, the valve discs are urged rapidly into contact with each other and rebound therefrom to a closed position. The speed of such rebound is determined by the speed with which the opening of the valve discs is accomplished, the same determining the energy of recoil arising upon the contact of the valve discs. The rapidity of this movement accomplishes valve closure as soon as the explosive fluid flow terminates or diminishes to predetermined proportions.

More specifically, it is an object of the present invention to provide an improved T-type filter having a quick-opening and quick-closing check valve within the outlet channel of the filter.

Another object of the invention is to provide a filter of the character described wherein the check valve may be disposed to accommodate unequal flow within various portions of the outlet channel.

Another object of the invention is to provide a filter of the character described wherein the open position of the check valve is such as to present a minimum of resistance to fluid flow in the outlet channel.

Another object of the invention is to provide a filter of the character described wherein the open position of the check valve is variable to accommodate fluctuations in the rate of fluid flow in the outlet channel, thereby continuously presenting a minimum of resistance to such fluid flow.

Another object of the invention is to provide a filter of the character described which has a minimum bulk.

Other and further objects of the invention will become apparent from the following discussion when read in conjunction with the accompanying drawings.

BRIEF DESCRIPTION OF THE DRAWING

In the drawings.

Throughout the several views set forth in the drawings, similar numerals are employed to represent similar parts of the illustrated form of the invention.

DESCRIPTION OF THE PREFERRED EMBODIMENT

Figure 1:
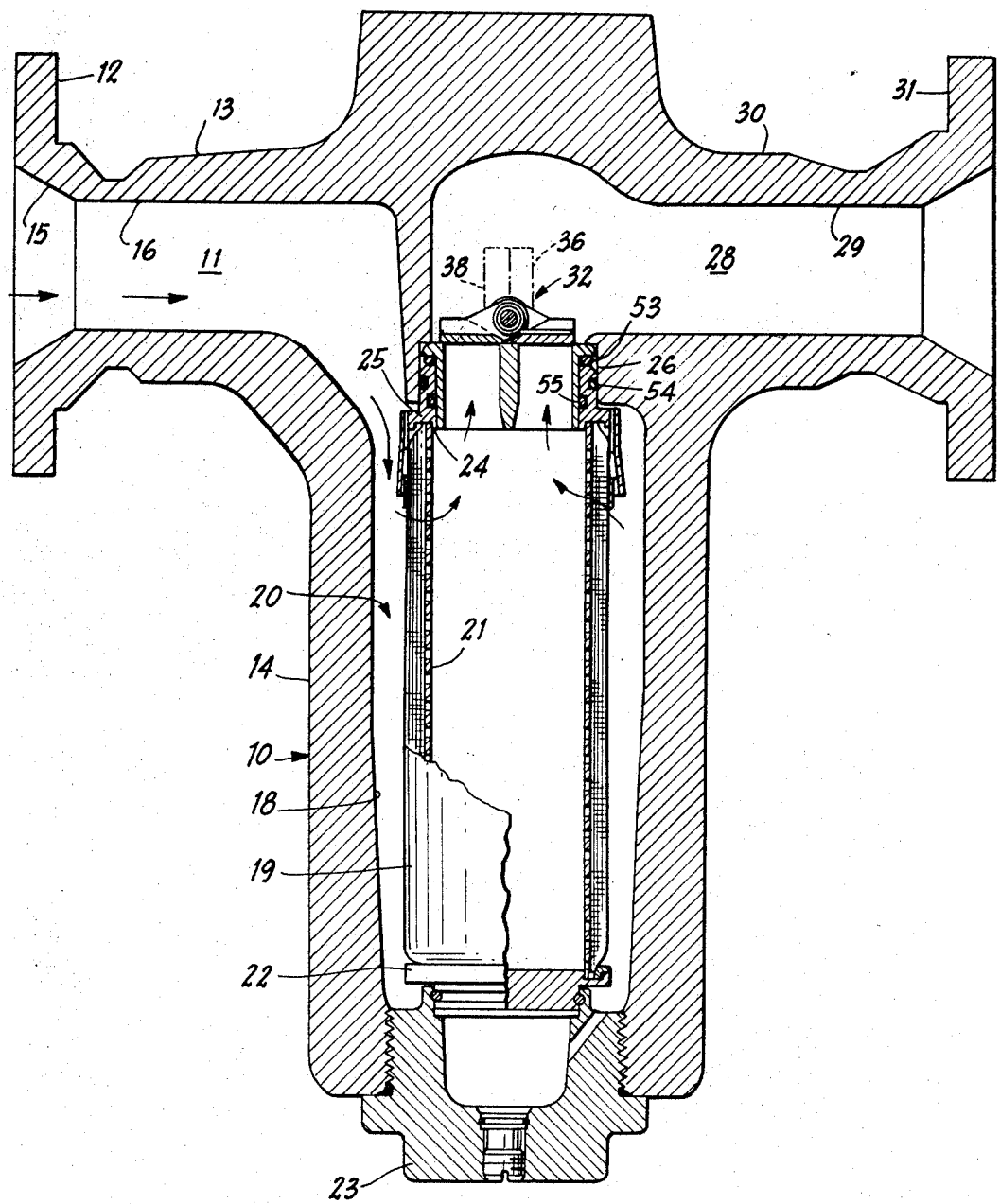
FIGURE 1 is a cross-sectional elevational view of one embodiment of the present invention.

As will be hereinafter seen, the present invention may be employed to advantage with various types of conventional filters so as to oppose undesired reversal of fluid flow therethrough, minimize resistance to fluid flow and accomplish other objects of the invention. The drawing depicts a preferred form of the invention wherein a T-type filter is used.

Thus, as may be seen in FIGURE 1 of the drawing, the said preferred form of the invention includes a T-type fitler having a housing, generally designated by the numeral 10 and provided with an inlet channel 11 extending through a flange 12 provided upon a tubular member 13 disposed transversely of and communicating with a hollow cylindrical member 14. The inlet channel 11 is defined by the internal periphery 15 of the flange 12, the internal periphery 16 of the tubular member 13 and the internal periphery 18 of the hollow cylindrical member 14 and the external periphery of a filter medium, such as the generally cylindrical wire mesh 19 which is disposed in spaced relation with respect to said internal periphery 18 of said hollow cylindrical member 14, thereby forming a spaced region 20 between said wire mesh 19 and said internal periphery 18 of the hollow cylindrical member 14.

The wire mesh 19 surmounts a perforated tube 21 and together therewith is accommodated within lower closure member 22 which surmounts a plug 23. The plug 23 is threadedly engaged with the hollow cylindrical member 14 and is removable therefrom when desired so as to provide access to the interior of the hollow cylindrical member 14 and the wire mesh 19 as may be required, for example, for maintenance purposes.

The upper ends of the wire mesh 19 and perforated tube 21 are engaged with a flange 24 provided upon a cylindrical collar 25 which is engaged with the internal periphery of an aperture 26 forming part of an outlet channel generally designated by the numeral 28 and further defined by the internal surface of said perforated tube 21, the internal surface 29 of a tubular member 30 disposed transversely of said hollow cylindrical member 14 and the internal periphery of a flange 31 provided on said tubular member 30.

An important feature of the invention resides in the check valve generally designated by the numeral 32 and disposed within said aperture 26. The check valve 32 may be seen more clearly in FIGURES 2 through 6 of the drawing.

Figure 2:
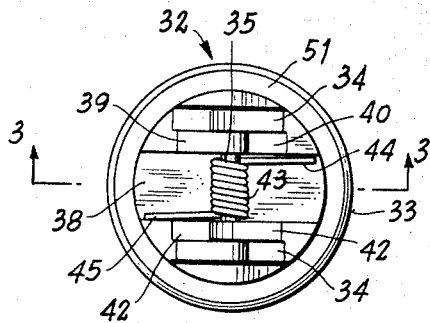
FIGURE 2 is a plan view of one form of the check valve employed in the aforesaid embodiment of the invention.

As may be seen in FIGURE 2 of the drawing, the check valve includes a flange 33 provided with a pair of brackets 34 which accommodate a pin 35 disposed diametrically of the check valve 32. A pair of semicircular discs 36, 38 are provided with brackets 39, 40, and 42 through which extends the aforesaid pin 35.

Figure 3:
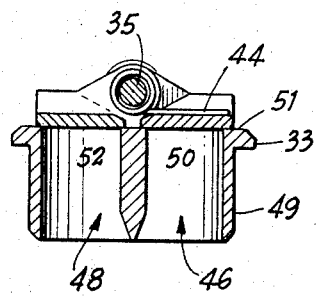
FIGURE 3 is a cross-sectional elevation of said check valve taken about the line 3—3 of FIG. 2 and showing the check valve in a closed position.
Figure 4:
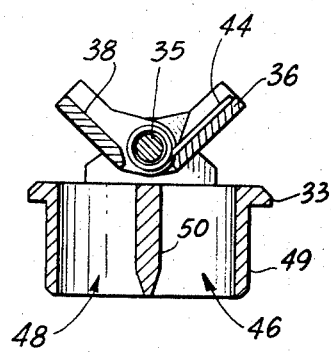
FIGURES 4, 5 and 6 are cross-sectional elevations of said check valve similar to that of FIGURE 3 but showing the check valve in various opened positions.
Figure 5:
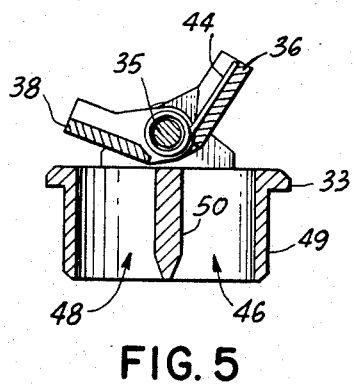

A coiled torsion spring 43 is disposed upon said pin 35 and provided with arms 44, 45 surmounting the semicircular discs 36, 38, said arms 44, 45 biasing the semicircular discs 36, 38 into the closed position with respect to apertures 46, 48 extending through the body 49 of the check valve 32, as may be seen in FIGURE 3 of the drawing. A web 50 is provided within the body 49 and disposed diametrically thereof, said web 50 being aligned with the pin 35. It will be seen in the said FIGURE 3 that when the semicircular discs 36, 38 are in a closed position, they surmount the upper surfaces 51, 52 of the flange 33 and web 50.

However, the semicircular discs 36, 38 are yieldable under fluid flow or pressure exerted through the apertures 46, 48 so as to cause said semicircular discs 36, 38 to rotate upon the pin 35. For example, if the fluid pressure arising from fluid flow through each of the apertures 46, 48 is equal, the semicircular discs 36, 38 will rotate upon the pin 35 through equal angular intervals to a position such as that depicted in FIGURE 4 of the drawing. If such fluid pressure in one of said apertures 46 is greater than that in the other of said apertures 48, the semicircular discs 36, 38 will rotate upon the pin 35 through unequal angular intervals to a position such as that depicted in FIGURE 5 of the drawing. Of course, each of the positions of the semicircular discs 36, 38 depicted in FIGURES 4 and 5 of the drawing will vary to correspond with any variation in fluid pressure and flow through the apertures 46, 48.

Figure 6:
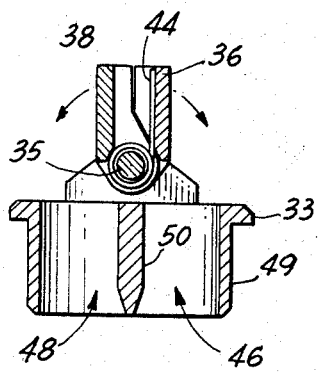

In the event of extremely high or sudden fluid pressures or flow through said apertures 46, 48, the semicircular discs 36, 38 may be rotated to the vertical position depicted in FIGURE 6 of the drawing, where they will contact each other and tend to rebound towards a closed position such as that depicted in FIGURE 3 of the drawing. For example, in the case of sudden, explosive pressures or flow, the semicircular discs 36, 38 will rotate rapidly to a vertical position where they will contact each other, their energy in excess of that required to cause them to assume said vertical position causing them to rebound with great speed towards the last-mentioned closed position. In this way, sudden, explosive flow or pressure will produce correspondingly rapid opening and closure of the semicircular discs.

It is to be noted that the semicircular discs 36, 38 may also make contact with each other in positions other than the vertical position depicted in FIGURE 6, said position being referred to only by way of example.

It is also to be observed that since the body 49 is cylindrical, it may be rotated to any desired position with respect to the aperture 26 of the outlet channel 28, thereby permitting optimum flow conditions through said outlet channel 28.

The check valve is sealed against undesirable leakage between the interior of the perforated tube 21 and that portion of the outlet channel 28 comprising the internal surface 29 of the tubular member 30, by way of the external periphery of the body 49, by an O-ring 53 abutting against the lower surface of the flange 33 and the upper surface of the cylindrical collar 25, and by a second O-ring 55 accommodated within a groove provided upon the internal periphery of said cylindrical collar 25 and abutting against the external periphery of the body 49 (see FIGURE 1).

Leakage from the spaced region 20 by way of the external periphery of said cylindrical collar 25 into that portion of the outlet channel 28 comprising the internal surface 29 of the tubular member 30 is also obstructed by an O-ring 54 which is accommodated within a groove formed upon the external periphery of the body 49 and abuts against the internal periphery of the aperture 26, thereby providing a seal against such leakage.

It will be seen from the foregoing that the check valve may be inserted within the filter so as to prevent fluid flow from the outlet channel to the inlet channel; that optimum flow and pressure conditions may be maintained by the self-adjustable characteristics of the semicircular discs employed in the check valve; that the energy of such discs which exists when they contact each other, as in the case of their vertical position depicted in broken lines in FIGURE 1 of the drawing, aids in effecting the rapid return of such discs to a closed position, thereby making the check valve highly responsive to rapid increases in pressure or flow followed by rapid decreases in pressure or flow. It will also be seen that when desired, the check valve may easily be removed for maintenance or repair purposes upon removal of the plug 23, the wire mesh 19 and perforated tube 21.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:
1. In a filter provided with a cylindrical housing, inlet and outlet channels extending laterally of the housing, generally cylindrical filter means disposed intermediately of said inlet and outlet channels and communicating therewith and perforated tubular means surmounted by said generally cylindrical filter means, the combination of a check valve comprising:
  (a) a body disposed within said outlet channel;
  (b) at least two apertures extending through said body;
  (c) a pair of brackets provided upon said body;
  (d) a pair of semicircular discs hinged to said brackets;
  (e) yieldable spring means engaged with said semicircular discs to urge them into closure of said apertures.
2. In a filter according to claim 1,
  (a) said body having a tubular conformation provided with a flange;
  (b) said apertures being defined by the internal periphery of the body and a web disposed diametrically therein;
  (c) the circumferential periphery of said body being provided with an O-ring contactable with said flange and the internal periphery of said outlet channel;
  (d) said brackets being provided with a shaft;
  (e) said semi-circular discs being provided with brackets rotatably affixed upon said shaft;
  (f) said yieldable spring means including a torsion spring disposed between the brackets of said semicircular discs and upon said shaft;
  (g) the arms of said torsion spring surmounting said semicircular discs.
3. In a filter according to claim 2:
  (a) said filter means including a generally tubular wire mesh terminating in at least one cylindrical ring accommodated within said outlet channel;
  (b) said O-ring surmounting said cylindrical ring, whereby said outlet channel is sealed against the communication of fluid from said inlet channel other than through said filter means and said apertures.

4. In a filter according to claim 1,
(a) said semicircular discs being subject to the pressure of a fluid communicated through said inlet channel, filter means, apertures and outlet channel, whereby said semicircular discs are urged to an open position with respect to said apertures so as to permit fluid flow through said outlet channel;
(b) said semicircular discs being rotatable by said fluid pressure into a position wherein they abut each other and rebound to a closed position with respect to said apertures.

5. In a filter according to claim 4:
(a) each of said semicircular discs being disposed to cover one of said apertures when the semicircular discs are in a closed position with respect to said apertures;
(b) the open position of each of said semicircular discs being determined by the fluid pressure in the aperture covered thereby.

References Cited

UNITED STATES PATENTS

| | | | |
|---|---|---|---|
| 1,124,587 | 1/1915 | Bullington | 210—136 |
| 2,757,753 | 8/1956 | Kasper | 55—417 X |
| 3,129,171 | 4/1964 | Rosaen | 210—136 X |
| 3,369,666 | 2/1968 | Hultgren et al. | 210—136 X |

REUBEN FRIEDMAN, *Primary Examiner.*

F. SPEAR, *Assistant Examiner.*